US009936362B2

United States Patent
Kornafeld (10) Patent No.: US 9,936,362 B2
(45) Date of Patent: *Apr. 3, 2018

(54) INTELLIGENT PRESENCE DETECTION MESSAGING

(71) Applicant: HEYWIRE, INC., Cambridge, MA (US)

(72) Inventor: Adam Kornafeld, Salem, NH (US)

(73) Assignee: HeyWire, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,789

(22) Filed: Sep. 26, 2016

(65) Prior Publication Data
US 2017/0034675 A1 Feb. 2, 2017

Related U.S. Application Data

(63) Continuation of application No. 14/637,660, filed on Mar. 4, 2015, now Pat. No. 9,456,317.
(Continued)

(51) Int. Cl.
*H04W 4/14* (2009.01)
*H04L 29/12* (2006.01)
(Continued)

(52) U.S. Cl.
CPC ........... *H04W 4/14* (2013.01); *H04L 61/2007* (2013.01); *H04W 4/008* (2013.01); *H04W 4/021* (2013.01);
(Continued)

(58) Field of Classification Search
CPC ......... H04W 4/008; H04W 4/02; H04W 4/12; H04W 4/14; H04W 4/20; H04W 4/206;
(Continued)

(56) References Cited

U.S. PATENT DOCUMENTS 6,449,483 B1 9/2002 Akhteruzzaman et al.
6,591,103 B1 7/2003 Dunn et al.
(Continued)

FOREIGN PATENT DOCUMENTS

| GB | 2397730 B | 6/2006 |
|---|---|---|
| GB | 2431820 A | 5/2007 |
| WO | 2007015075 | 2/2007 |

OTHER PUBLICATIONS

European Search Report for corresponding European application No. 09805443.0, dated Dec. 11, 2013, total pp. 8.
(Continued)

*Primary Examiner* — Jean Gelin
(74) *Attorney, Agent, or Firm* — Chapin IP Law, LLC (57) ABSTRACT

A social messaging hub provides communication services including intelligent presence detection messaging for a data enabled device having Internet network access capabilities. In one embodiment, a user is given a registered phone number and has multiple devices with unique IP addressable identifications which serve as a source and destination identifiers of the associated data enabled devices. The hub receives device and default location information, sets geofence boundaries, receives a notification of device positions and then delivers messages based on the proximity of devices to each other and user preferences.

15 Claims, 5 Drawing Sheets

Related U.S. Application Data (60) Provisional application No. 61/947,513, filed on Mar. 4, 2014.

(51) Int. Cl.
   *H04W 4/02*    (2018.01)
   *H04W 4/00*    (2018.01)
   *H04W 4/12*    (2009.01)

(52) U.S. Cl.
   CPC ........... *H04W 4/023* (2013.01); *H04W 4/025* (2013.01); *H04W 4/12* (2013.01)

(58) Field of Classification Search
   CPC ....... H04W 4/22; H04W 64/00; H04W 4/021; H04W 4/023
   USPC ... 455/404.1, 404.2, 414.1, 414.2, 421, 422, 455/456.1, 418, 419, 456.2, 456.3, 457
   See application file for complete search history.

(56) References Cited

U.S. PATENT DOCUMENTS

| | | | |
|---|---|---|---|
| 6,757,365 | B1 | 6/2004 | Bogard |
| 7,010,312 | B1 | 3/2006 | Zechlin |
| 7,197,035 | B2 | 3/2007 | Asano |
| 7,263,076 | B1 | 8/2007 | Leibovitz et al. |
| 7,275,104 | B1 | 9/2007 | Martinez et al. |
| 7,343,168 | B2 | 3/2008 | Valloppillil |
| 7,380,022 | B2 | 5/2008 | Tell et al. |
| 7,446,655 | B2 | 11/2008 | Jha et al. |
| 7,499,704 | B1 | 3/2009 | Bonner |
| 7,564,958 | B1 | 7/2009 | Contractor |
| 7,606,568 | B2 | 10/2009 | Gallagher et al. |
| 7,693,535 | B2 | 4/2010 | Dunko |
| 7,734,908 | B1 | 6/2010 | Kung et al. |
| 7,860,525 | B2 | 12/2010 | Parkkinen et al. |
| 7,865,198 | B2 | 1/2011 | Shin |
| 8,463,304 | B2 | 6/2013 | Lauer et al. |
| 8,989,713 | B2 | 3/2015 | Doulton |
| 9,710,982 | B2 * | 7/2017 | Matthews, III .... G07C 9/00309 |
| 2004/0076144 | A1 | 4/2004 | Ishodoshiro |
| 2004/0109452 | A1 | 6/2004 | Takihiro et al. |
| 2005/0114367 | A1 | 5/2005 | Serebrennikov |
| 2005/0148353 | A1 | 7/2005 | Hicks et al. |
| 2005/0277407 | A1 | 12/2005 | Ahn et al. |
| 2005/0288045 | A1 | 12/2005 | Yang et al. |
| 2006/0040606 | A1 | 2/2006 | Kangas |
| 2006/0142012 | A1 | 6/2006 | Kirchhoff et al. |
| 2006/0148495 | A1 | 7/2006 | Wilson |
| 2007/0066318 | A1 | 3/2007 | Danzeisen et al. |
| 2007/0073585 | A1 | 3/2007 | Apple et al. |
| 2007/0190978 | A1 | 8/2007 | White et al. |
| 2008/0043969 | A1 | 2/2008 | Shi |
| 2008/0114862 | A1 | 5/2008 | Moghaddam |
| 2008/0140850 | A1 | 6/2008 | Gade et al. |
| 2008/0172496 | A1 | 7/2008 | Middleton et al. |
| 2008/0182563 | A1 | 7/2008 | Wugofski et al. |
| 2008/0263137 | A1 | 10/2008 | Pattison et al. |
| 2008/0293404 | A1 | 11/2008 | Scherzer et al. |
| 2009/0005005 | A1 | 1/2009 | Forstall et al. |
| 2009/0031232 | A1 | 1/2009 | Brezina et al. |
| 2009/0154434 | A1 | 6/2009 | Tanaka et al. |
| 2009/0156202 | A1 | 6/2009 | Reiss et al. |
| 2009/0186634 | A1 | 7/2009 | Sureka |
| 2010/0029273 | A1 | 2/2010 | Bennett |
| 2011/0045828 | A1 * | 2/2011 | Madan ................. H04Q 3/0045 455/433 |
| 2011/0099142 | A1 | 4/2011 | Karjalainen et al. |
| 2011/0195722 | A1 * | 8/2011 | Walter ..................... G01S 5/02 455/456.1 |
| 2011/0270748 | A1 | 11/2011 | Graham, III et al. |
| 2012/0226759 | A1 | 9/2012 | Lew et al. |
| 2012/0239469 | A1 | 9/2012 | Steinberg et al. |
| 2013/0194135 | A1 * | 8/2013 | Farnham ............... G01S 5/0252 342/450 |
| 2013/0196697 | A1 | 8/2013 | Lew et al. |
| 2013/0298037 | A1 * | 11/2013 | Matthews, III ......... H04L 63/08 715/753 |
| 2015/0237486 | A1 | 8/2015 | Lauder |

OTHER PUBLICATIONS

International Search Report and Written Opinion dated Dec. 7, 2011 in corresponding International Application No. PCT/US2011/037190.

\* cited by examiner

INTELLIGENT PRESENCE DETECTION MESSAGING

CROSS REFERENCE TO RELATED APPLICATIONS

This application is continuation in part of U.S. patent application having Ser. No. 14/637,660 entitled "INTELLIGENT PRESENCE DETECTION MESSAGING" filed Mar. 4, 2015 that shares inventorship with the present application, which claims the benefit of U.S. Provisional Application No. 61/947,513 filed Mar. 4, 2014.

FIELD OF THE INVENTION

The present invention relates to messaging and communications, and to mobile telephony messaging and efficient delivery of messages to one or more data enabled devices, mobile phones and other devices.

BACKGROUND

People around the world are confronted by a number of communications and writing devices which have evolved relatively recently from the separate areas of telephone communications networks, wireless networks, television or cable networks, and computer networks and personal computers. The more recent devices, mobile phones with message/picture/video texting, personal digital devices for Internet browsing and computer-based blogging and social networking sites have been shaped in part by the separate networks of origin, but the nature and capabilities of many of these now-ubiquitous devices have both converged, and also advanced quickly in different directions as the industries controlling each sector have capitalized on their market power, reservoir of legacy subscribers and, in some cases, regulatory barriers and proprietary network equipment and connection protocols, to introduce new consumer features, often employing developments from other consumer products, and aiming to lure subscribers by mimicking those products. However, in doing so, each industry has also been limited by its own equipment, data transfer speeds and connection abilities.

Thus, as digital imaging advanced and consumers learned to take and handle images and to attach the images to e-mail messages, imaging chipsets were incorporated into mobile telephones and the mobile phones were configured to display images and allow their transmission between phones. Text and message protocols allowed transmission of 'instant' messages, and coded standardized greetings and messages between phone users, filling a niche for immediate portable, personal communication that was not met by existing personal computer devices. Devices like the iPhone®, introduced in 2007 allowed a user to access his Internet-based email from his mobile phone via a specially-configured data connection with his mobile service provider, and to exchange content via wireless connection to his personal computer.

However, despite these developments blurring boundaries between the classical phone, mobile telephone, Internet, wireless and television or cable networks, there has not been a convergence. Rather, although industry and government groups have promoted interface standards for several different classes of data or communication, each industry has retained much of its special structure, and the devices served by an industry (such as mobile telephones) may find their feature set constrained by intrinsic limitations of bandwidth and connectivity, by available networking equipment base, and by the level of contractual cooperation agreements of its provider. The many different classes of communications systems now available, and the many separate provider networks in each class, have also required the development of new supporting entities, such as nationally- or internationally-extending registries, aggregators, exchanges and other entities, in order to affect timely transfer of data, messages and/or entertainment content. This second-level infrastructure imposes further constraints of the feasible, or economically feasible, set of features that a consumer may exercise. Thus, for example, mobile telephones have been augmented with a display and the ability to run small applications such as games, MP3 players, Internet browsers/applications and email retrieval, while personal computers have the capability to run larger programs, employ wireless connectivity and perform voice-over-IP (VOIP) Internet communications. Various special-purpose applications requiring cross-platform connections may be provided, or applications simulating cross-platform capabilities may be developed, by a service provider, such as a television-displayed chat session available for subscribers of a TV provider. However, many other personal devices while having large data capacity, ability to connect to another user device and ability to run entertainment apps, may entirely lack the mobile telephone electronic circuitry necessary for exchanging mobile messages with telephone users. Additionally, the delivery of messages in some social messaging systems is affected by limitations of carrier networks and international boundaries. It is therefore desirable to provide a system for enhanced communication between personal devices.

Conventional systems have attempted to control where messages (i.e., to what devices) should be delivered either by manual intervention or server initiated control based on some trigger (e.g. time of day, day of week etc.). Previous attempts to solve such delivery problems have utilized GPS devices (generally requiring an excessive amount of battery power) or other geo-location deterministic methods and required user input to identify a "limited" set of data of where such locations are (e.g., work, home, etc.). In addition, mobile carriers have constrained bandwidth and spectrum issues in their networks.

SUMMARY OF THE INVENTION

In contrast to conventional systems, embodiments disclosed herein provide for efficient delivery of messages to one or more data enabled devices. Data enabled devices include mobile phones, smart phones and other devices which support a data connection (e.g., an IP connection). Such embodiments avoid delivering messages to devices that are not being used and instead deliver messages to the active device (or devices) as specified by a user. The system also supports multiple devices for messaging.

In one embodiment, a technique for electronic message delivery includes obtaining a plurality of unique identifiers, assigning to a user of a data enabled device a unique user identifier from the plurality of unique identifiers, associating the unique user identifier with a plurality of data enabled device identifiers, each one of plurality of data enabled device identifiers corresponding to one of a plurality of data enabled devices, registering the unique user identifier to data enabled device identifier associations in a database, receiving device and default location information from at least one of the plurality of data enabled devices, setting at least one geofence boundary including at least one office geofence and receiving a notification of device position from at least one of the plurality of data enabled devices. The technique further includes receiving a message for delivery to the user, analyzing the message for at least one of location context, device context and time context and providing the message to at least one of the plurality of data enabled devices associated with the unique user identifier based on proximity of the one or more data enabled devices to each other, a predetermined user preference and at least one of the location context, a device context and the time context.

Such a technique enables seamless presence detection and intelligent handling of message delivery and provides for more efficient and timely message delivery. Embodiments disclosed herein enables intelligent direction/routing of messages without server side or user initiation (i.e., client devices initiate the process and notify server/network where to route messages). Data enabled devices include, but are not limited to, an iPod touch®, iPad®, portable e-Reader, a personal computer, a portable game player, a game console, a laptop, a television settop receiver, a television set, tablet or a netbook computer and wearable devices (e.g. glasses). The user of a non-telephony data enabled personal electronic device or a data enabled telephony device (e.g., smartphone, iPhone) is given a registered phone number (or an additional phone number for data enabled telephony devices) which serves to identify the source device in messages originating from the user of service on the data enabled device. The phone number also serves to indicate destination in messages directed to the user of the service on the non-telephony data enabled device. Such messages may originate in mobile telephones of other users, or in similarly equipped and provisioned non-telephony or telephony data enabled devices of other users. A social messaging hub operates such that incoming mobile text messages/multi-media messages are transparently routed, locally or internationally, through existing Short Message Service/ Multimedia Messaging Service/Enhanced Messaging Service SMS/MMS/EMS messaging infrastructures including messaging aggregation and delivery organizations, thus messaging bi-directionally between mobile phones and the user's non-telephony data device or smartphone.

Embodiments of the invention include any type of computerized device, workstation, handheld, tablet or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable storage medium including computer program logic encoded thereon that, when performed in a computerized device having a coupling of a memory and a processor and a display, programs the processor to perform the operations disclosed herein. Such arrangements are typically provided as software, code and/ or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include web applications, browsers, IP applications and data enabled device applications as will be explained in more detail.

It is to be understood that the features of the social messaging hub can be embodied strictly as a software program, as software and hardware, or as hardware alone such as within a single processor or multiple processors, or within an operating system or within a software application.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein:

DETAILED DESCRIPTION

A social messaging hub combines connectivity to the global SMS infrastructure and IP connectivity to data enabled devices to provide communication services including intelligent presence detection messaging for a data enabled device having Internet network access capabilities. A user is given a registered phone number and unique IP addressable identification which serve as a source and destination identifier of the associated data enabled device. The social messaging hub receives device and default location information, sets geofence boundaries, receives a notification of device position and then delivers SMS based on the proximity of devices to each other and user preferences.

Bluetooth® low energy, Bluetooth® LE, or BLE, also marketed as Bluetooth® Smart, is a wireless computer network technology designed for applications in the healthcare, fitness, security, and home entertainment industries. Presence detection applications are well suited to the long battery life possible for 'always-on' devices using Bluetooth LE. Some relevant applications include, for example, proximity profile (PXP) allows a proximity monitor to detect whether a proximity reporter is within a close range. Physical proximity can be estimated using the radio receiver's received signal strength indication (RSSI) value, although this does not have absolute calibration of distances.

Bluetooth LE is supported, for example, on release of Apple iOS 7. Current (GPS+WiFi-based) location technology can take latitude and longitude coordinates with a radius value to set up a geofence and notify applications when the phone enters or leaves the fenced area. This is ideal for setting up broader geofences (at home or at work), but falls short when the radius is small, especially in-building. With the introduction of Bluetooth LE, the phone's location framework can be supplied with arbitrary identifier strings instead of the latitude-longitude-radius trio. This enables a phone to monitor for Bluetooth LE devices in the vicinity emitting this identifier string.

Bluetooth LE beacon devices can emit arbitrary identifier strings in regular intervals and operate six months or more running from a single battery. In some embodiments, a mobile device can be set up to act as a beacon. From a social media hub perspective, this technology is used for monitoring when mobile devices are in the vicinity of office landlines and forwarding texts accordingly (to the landline and connected text enabled devices if the mobile is in the vicinity of the landline and to the mobile device if it is further away from the landline (as defined by user preference).

Additionally, if a user is sitting near the user's computer (the computer and the phone are both Bluetooth LE enabled and one of them sensing the other's beacon signal), texts are advantageously delivered on the web interface, or desktop client instead of on the mobile device.

Use of Bluetooth LE and implementation in plethora of devices and its functionality has not been previously available. Such techniques can be applied to any application/ function that would benefit from being "aware" of presence activity/data in real-time without need for user intervention/ initiation of any type.

Figure 1:
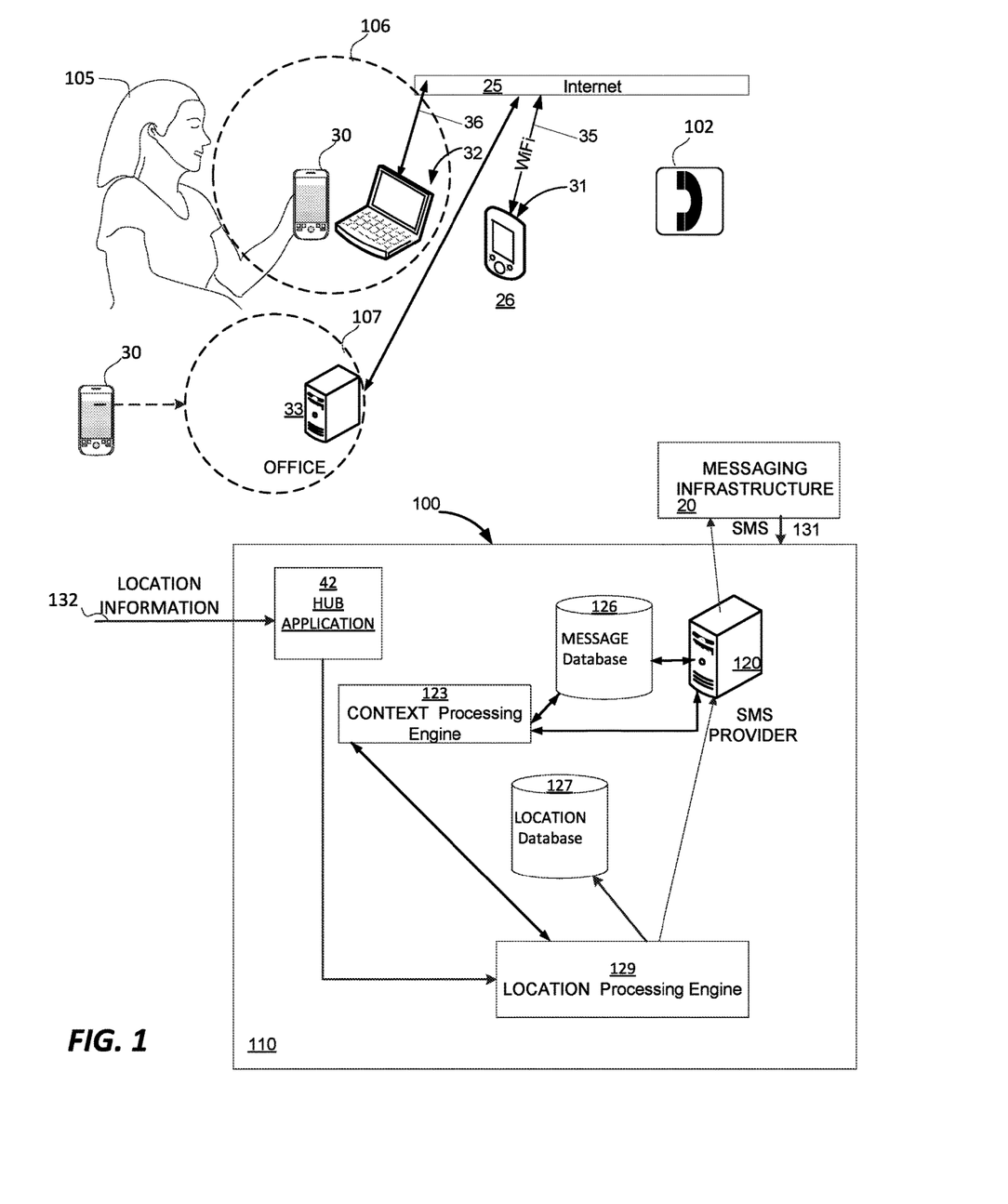
FIG. 1 is a block diagram of a system for intelligent presence detection messaging according to embodiments herein.

Some embodiments described below although described in terms of Short Message Service/Multimedia Messaging Service/Enhanced Messaging Service (SMS/MMS/EMS) are not meant to limit the disclosure to only these types of messages. Referring now to FIG. 1, a block diagram illustrates a general architecture of the system and process. The system 100 includes a social messaging hub 110 which includes a hub application 42 coupled to a location processing engine 129. The system 100 further includes a context processing engine 123 couples to a message database 126. The location processing engine 129 is coupled to a location database 127 and an SMS provider 120. It is understood that location database 127 and message database 133 can be separate databases or a database which also includes user preferences and device identifiers described below. A user 105 can have several devices which can communicate with the location processing engine 129 using internet accesses and additionally through the global messaging infrastructure 20. The devices can include, but are not limited, to a mobile phone 30, data enabled device 32, smart phone with WIFI capability 31 and a "land line" 102. Devices 30, 31, 32 and 102 are collectively referred to as devices. These devices may have Bluetooth LE capability. The mobile phone 30 (and the other devices) can be configured to have a geofence 106 (i.e., a virtual fence) enabled by Bluetooth LE or similar technology. Optionally another geofence 107 can be set up for example, to encompass an office with a SMS enabled desktop PC 33.

In operation in one embodiment, the user 105 might, for example, have the mobile phone 30 near data enabled device 32 such that data enabled device 32 is within the geofence 106 of mobile phone 30. It is understood that the user 105 can set up geofence boundaries and message delivery preferences which are stored in location database 127. The devices can continuously supply location information 132 to the social messaging hub 110 through hub application 42. It is understood that in some embodiments Bluetooth low energy monitors, beacon location monitoring (including monitors and reporters) can be used to substitute for or enhance geofence boundary monitoring.

When an SMS text message 131 is received, the system 100 can determine the location of the various devices and using this information along with user preferences for message delivery send the message to one or more of the user's devices. For example, here the system 100 can deliver the message to data enabled device 32 which is within the geofence 106 of mobile phone 30 instead of delivering to the mobile phone 30 which might incur some messaging or data charges from a mobile carrier.

In another embodiment, the context processor engine 123 analyzes the message 131 to be delivered to the user 105. The context analysis is used in conjunction with data from the location processing engine 129 to determine when, where and to what device the message is to be delivered. An SMS message can be analyzed for location, time and device contexts. In one example, the message is an SMS text message which includes the text "Call me after 2 PM when you get to the office for a teleconference." The message might not get delivered immediately, but it could possibly be delivered to an SMS enabled office desktop PC 33 when the user 105 logs in on desktop PC 33. The location processing engine 129 might detect the user 105 entering geofence 107 in the vicinity of the coordinates of the office by entering the geofence 107 with mobile phone 30 at 12:30 PM or by the office desktop PC 33 determined to be turned on at 12:30 PM. The context processor engine 123 determines that the message 131 refers to teleconference which the user 105 has set a preference for using the office desktop PC 33 so the message 131 might be delivered at 1 PM to the office desktop PC 33. Such a system would provide for more efficient message delivery. In one other aspect of the invention, notifications and message delivery appear to be controlled by e a smart assistant (or A.I.) who nags you only when she determines it's the best time and the best place and device. Determining the device context (e.g., a specific device or device type) can help determine other parameters which would affect message delivery in addition to user preferences.

Figure 2:
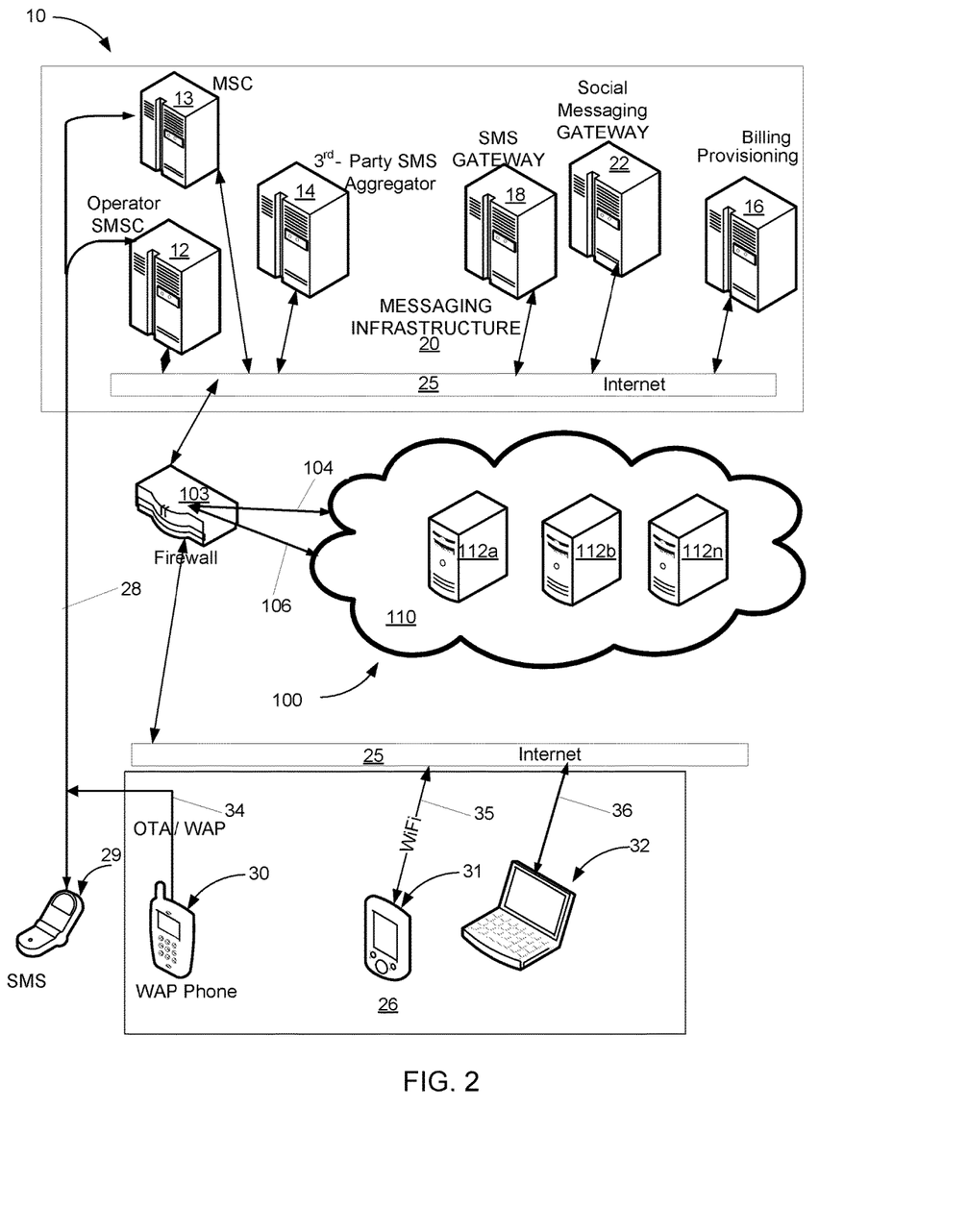
FIG. 2 is a schematic illustration of a social messaging hub and network environment/messaging infrastructure in accordance with one example embodiment disclosed herein.

Now referring to FIG. 2, an exemplary social messaging hub 110 operates in network environment 10 which includes messaging infrastructure 20. The social messaging hub 110 includes one or more processors 112a-112n and is coupled to the network environment 10 and messaging infrastructure 20 through a firewall 103. The firewall 103 is typically located at a social messaging hub 110 hosting facility.

The messaging infrastructure 20 includes, but is not limited to, a Short Message Service Center (SMSC) 12, a third party SMS aggregator 14 (also referred to a SMS aggregator 14), a billing and provisioning system 16, an SMS Gateway (SMS-GW) 18, social messaging gateways 22 and a cellular phone infrastructure 28. Other components of the messaging infrastructure 20 include a Mobile Switching Centre (MSC) 13 and additional SMS-Gateways and other SMSCs and billing and provisioning systems provided by additional mobile carrier service providers (not shown). The SMSC 12 and the billing and provisioning system 16 are typically operated by a mobile carrier service provider. The MSC 13 is also typically operated by a mobile carrier service provider. The social messaging gateways 22 include connections to IM services, for example AOL instant messenger (AIM), Yahoo Messenger, Windows Live Messenger Jabber, Skype, Tencent QQ, ICQ and GoogleTalk (gTalk), and other social networks such as Facebook and Twitter. Therefore instant messages and other message types can be delivered to data enabled devices using embodiments described herein.

In one embodiment, the social messaging hub 110 communicates with the systems in the messaging infrastructure 20 (e.g., SMSC 12, the third party SMS aggregator 14 and the billing and provisioning system 16) using various network protocols including the Short Message Peer-to-Peer (SMPP) protocol, Signaling Transport (SIGTRAN) protocol or SS7 protocol. The SMPP protocol is a telecommunications industry protocol for exchanging SMS messages between SMS peer entities.

In this embodiment, the link between the social messaging hub 110 and the messaging infrastructure 20 is secured by the firewall 103 using, for example, a virtual private network (VPN) connection with HTTPS using 1024 bit (3DES-SHA1) encryption. Messages are transferred over SMPP link 104 and provisioning and single sign on (SSO), XML and SOAP messages and other control traffic are interchanged over control link 106. In another embodiment, messages are transferred over SIGTRAN (SS7 over IP) depending on the connection (e.g., a connection to a European Mobile Operator).

The social messaging hub 110 is connected via the Internet 25 or a dedicated connection to the messaging infrastructure 20 that relays messages between existing customer equipment, for example, a mobile phone 30 (e.g., a data enabled mobile phone, a data enabled WiFi phone and other data enabled devices such as a laptop, netbook, tablet and a smart phone). The mobile phone 30 can be connected to the social messaging hub 110 over the cellular phone infrastructure 28 through the SMSC 12 using an SMS protocol. The MSC 13 is also connected to the cellular phone infrastructure. The data enabled mobile phone 30 can be connected to the social messaging hub 110 over the cellular phone infrastructure using a data connection provided by OTA/WAP protocols. A data enabled WiFi phone 31 can be connected to the social messaging hub 110 via a WiFi connection to the Internet. It is understood that a mobile phone can be data enabled via both a WAP connection and a WiFi connection. The data enabled WiFi phone 31 is sometimes referred to as a dual mode phone if it can also connect over WAP. As referred to herein, a "non-telephony" device is a data enabled device which does not incorporate mobile phone hardware and software and which sends and receives SMS messages over an IP channel in contrast to mobile phone 30 which sends and receives SMS messages over standard cellular phone control channel.

A data enabled device, for example a laptop personal computer 32, can be connected to the social messaging hub 110 via a wired Internet 25 connection 36 or a wireless Internet connection (not shown). Other mobile/portable data enabled devices (not shown) include but are not limited to a portable media players, personal digital assistants, Wi-Fi mobile platforms, pad-tablet computers, portable e-Readers, personal computers, portable game players, game consoles and netbook computers which can be connected to the social messaging hub 110 via the Internet 25 using a WiFi, wired or other wireless connection. These devices, the data enabled mobile phone 30 and the data enabled WiFi phone 31 are collectively referred to as a data enabled device 26 or devices 26 and these devices generally establish an Internet protocol (IP) session or connection with the social messaging hub 110. Some data enabled devices 26 interface with the social messaging hub 110 using a client browser 37 and other data enabled devices 26 interface with the social messaging hub 110 using a client software component (also referred to as a client application or simply "app"). The client browser 37 (FIG. 3) communications to a corresponding web application and the client application (app) are collectively referred to as application 40. In one embodiment the application 40 (FIG. 3) (also referred to as a social messaging application or App) is a for example a HeyWire App an application supplied by HeyWire Inc. and referred to as HeyWire App 40 or simply HeyWire.

In operation and as described below in more detail, the social messaging hub 110 obtains a plurality of unique identifiers which in one embodiment, are telephone numbers acquired through or serviced by a competitive local exchange carrier (CLEC), local exchange carrier (LEC) or other provider that is authorized to issue or service registered phone numbers, and the set of numbers so issued may be serviced by that carrier's network, another carrier network or by a separate entity or sub-entity such as a network unaffiliated virtual operator (NUVO), that serves as the service provider to users and functions as a destination carrier to receive messages directed to its telephone numbers from the SMS aggregator 14, an SMS operator (e.g., a mobile carrier), a content provider or another NUVO, and to provide an Internet interface for delivery of the messages to users' data enabled devices 26.

The social messaging hub 110 assigns a user of a data enabled device 26 a unique user identifier from the plurality of unique identifiers and the social messaging hub 110 associates the unique user identifier with one or more data enabled device identifiers. The data enabled device identifier includes but is not limited to a network address, a Unique Device Identifier (UDID), a Media Access Control address (MAC address), a International Mobile Equipment Identity (IMEI), a Mobile Equipment Identifier (MEID), a Electronic Serial Number (ESN) and a CPU serial number, of the data enabled device 26. The social messaging hub 110 registers the associations between the unique user identifier with the data enabled device identifiers in a database. After the user is assigned a unique user identifier, a userid and password is when the application 40 is started. When the user registers one or more enabled device 26 and signs-in to an IM service or social media account (e.g., AIM, Yahoo Messenger, Windows Live Messenger and GoogleTalk, Facebook, Twitter, etc.) the account information is stored, in certain embodiments, on the user's data enabled device in a mini database for applications. Previously stored login/signon information can be retrieved in order to sign on the user automatically.

For inbound messages (i.e., sent to the data enabled device 26), the social messaging hub 110 receives the text message from the messaging infrastructure 20 (e.g., message service SMSC 12, or SMS aggregator 14). The message is directed to the user's data enabled device 26 having the registered unique identifier obtained from the text message source, and the social messaging hub 110 provides the message to an inbound service, establishes a connection between a data enabled device 26 and the inbound service and pushes the text message from the inbound service to an application or web browser running on the data enabled device 26.

For outbound messages (i.e., sent from the data enabled device 26). the social messaging hub 110 receives the text message from the data enabled device 26 including a destination identifier for the message, processing the message and provide the message to SMS destination through the messaging infrastructure 20 (e.g., SMSC 12, or SMS aggregator 14) for delivery to the message recipient.

The social messaging hub 110 can submit multiple messages in one transmission using a 1 to many feature in conjunction with the application 40 (i.e., web client or smart phone app). The social messaging hub 110 transfers messages between data enabled devices 26 without the use of the message infrastructure 20 even if phone numbers are used as the addresses. Provisioning and SSO are incorporated in the social messaging hub 110 such that once a registered phone number and other user information is stored in database 126 connections and logins can be established automatically.

As described below in conjunction with FIGS. 3 and 4, the social messaging hub 110 may be configured to deliver messages to specific data enabled devices associated with a user. More generally, embodiments of the social messaging hub 110 include an application which enables a user (sometimes referred to herein as a subscriber) in conjunction with a location processing engine and for example Bluetooth LE enabled devices, to direct message to one or more user data enabled devices based on the proximity of devices to each other and user preferences.

When the social messaging hub 110 is a separate message service center entity, the social messaging hub 110 operations may be incorporated by one or more mobile providers to extend their subscriber service capabilities and the provider entity may provide dedicated connections for affecting coordination between services, call logs and billing for the affected accounts.

Features of the social messaging hub 110 may be provided within, or as external hosting services communicating with an existing mobile network provider as a web based application using advanced web capabilities, and may be configured to handle all forms of messaging for the subscribers. Subscription/Unsubscription operations can be performed from a web client running on any data enabled device 26 that supports standard Internet browsers or from IP based applications.

Figure 3:
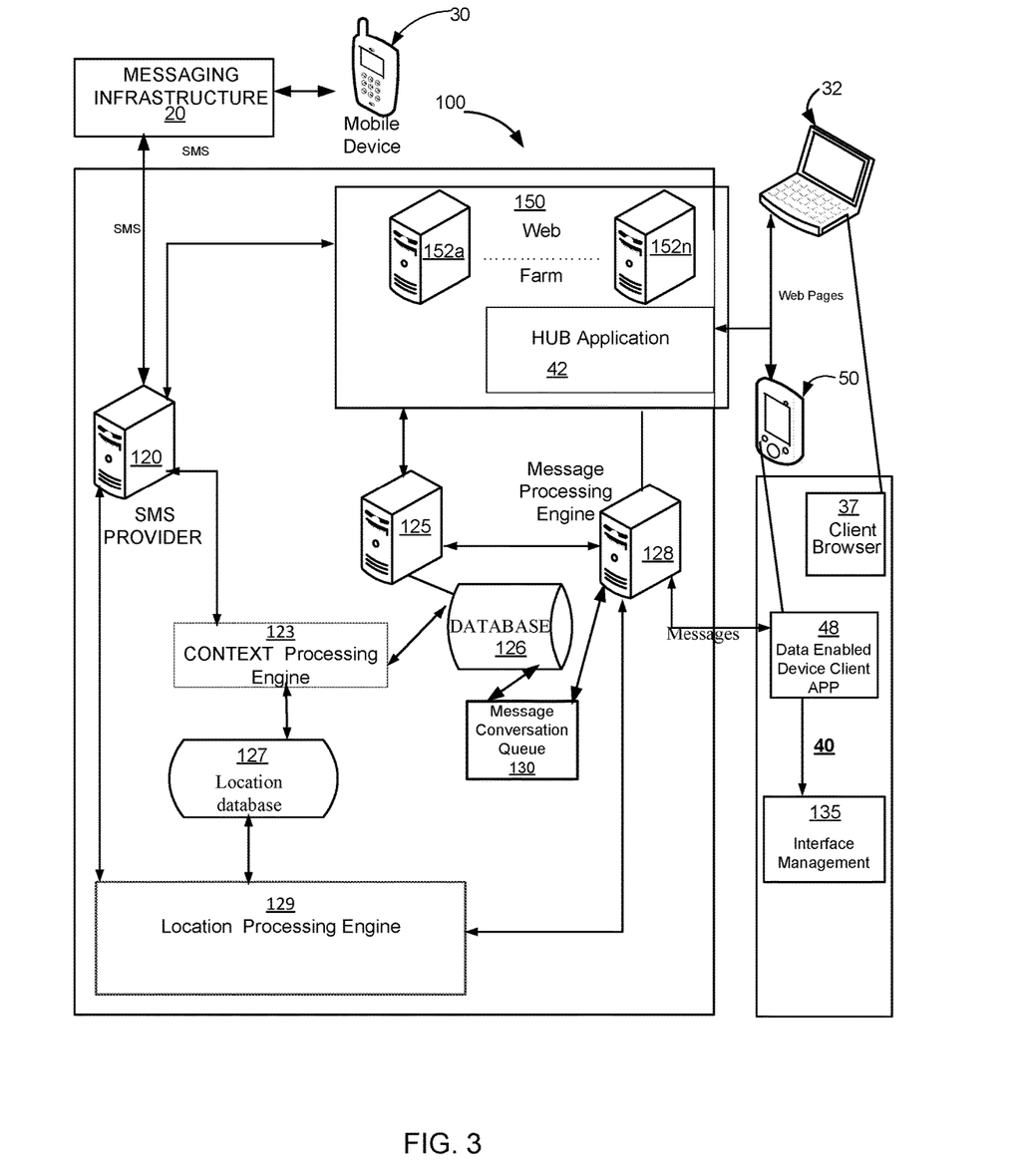
FIG. 3 is a schematic illustration of the social messaging hub of FIG. 1 including an embodiment of a system configured for intelligent presence detection messaging.

FIG. 3 illustrates the architecture of one embodiment of the social messaging hub 110 for multiple messaging applications. The social messaging hub 110 includes an SMS provider 120 which provides the interface to the messaging infrastructure 20 and in particular in one embodiment to the SMSC 12, SMS aggregator 14 and (SMS-GW) 18. The SMS provider 120 is used to send and receive SMS/MMS/EMS messages respectively to and from data enabled devices: a mobile phone 29 through the cellular phone infrastructure 28 and another data enable device 26 shown here as laptop personal computer 32 and a smart phone 50. The social messaging hub 110 further includes a location processing engine 129 which is coupled to a location database 127, the SMS provider 120 and the message processing engine 128.

The SMS provider 120 is interfaced to a web farm 150 having one or more servers 152a-152n (collectively referred to as web server 152). The servers 152a-152n store the SMS/MMS/EMS messages received and SMS/MMS/EMS messages to be delivered in conjunction with database server 125 and database 126. The servers 152a-152n also support a Hub application 42 which runs in conjunction an application 40 on data enabled device 26, here laptop 32 or smart phone 50. The web farm 150 is coupled to a database server 125 and corresponding database 126 which is used to store user information including the association between the assigned unique user identifiers and data enabled device identifiers. The social messaging hub 110 further includes a common message conversation queue which is interfaced to the database 126 and the message processing engine 128.

The database server 125 is connected to a message processing engine 128 which has an associated message processing database 126. Database server 125 in conjunction with database 126 primarily stores SMS messages and certain user information and it is used when interfacing to the messaging infrastructure 20. It is understood that database 126 and database 127 can be separate database or can be combined into a single database. The components of the social messaging hub 110, in one embodiment, are developed in C, C++, JAVA® or other suitable programming language, and include web servers, such as Apache, Microsoft Internet Information Services platform (IIS) or other suitable server systems operating on a UNIX, Microsoft or other operating system platform to store and communicate messages to Internet devices. An exemplary software framework for the social messaging hub 110 includes the following:

In one embodiment, the Hub application 42 on servers 152a-152n runs on a .Net framework and is hosted on a Microsoft IIS7 system on a windows 2008 server. The database 126 can be a relational database implemented in this embodiment using Microsoft SQL Server, and the message processing engine 128 is implemented as a COMET server, using a COMET engine (using .net framework). The SMS provider 120 is a C++ server application which interacts with the messaging infrastructure 20.

Implementations for specific social messaging entities and devices are schematically illustrated in FIG. 3 which, for purposes of discussion, references the above-described software and other communications elements. It is understood, however, that the servers, interfaces and other hardware and software elements of each system may vary within a broad range, so long as the system is well integrated with its operative components and is configured to communicate effectively with the other messaging entities involved.

In operation, the SMS provider 120 in conjunction with the location processing engine 129, the context processing engine 123 and the message processing engine 128 determine from the location information 132, the context of messages to be delivered (e.g., time context, device context and location context) and predetermined user preferences where, when and to which devices to route received messages directed to a user (e.g., associated with the unique identifier) and then sending the messages to one or more devices through the messaging infrastructure 20. The message may be routed through to one of the SMSC 12, the SMS aggregator 14 the (SMS-GW) 18 or other communications entity, operated by a mobile operator, aggregator or some other intermediary.

The social messaging hub 110 consolidates message delivery into a common message conversation queue 130 and intermixes messages from other messaging services, including presence activity and geographic location data into the common message conversation queue 130. This consolidation, allows the social messaging hub 110 to enable personal replies to be threaded back to the user's social inbox so individual chat conversations can continue across multiple data enabled devices to provide multi-screen messaging.

When used to support multiple mobile network providers, advantageously, the social messaging hub 110 is configurable for each provider. It is understood that the various server functions of the social messaging hub 110 could be run on a single computer or multiple computers, storage could be provided by individual storage media or a storage area network.

Figure 4:
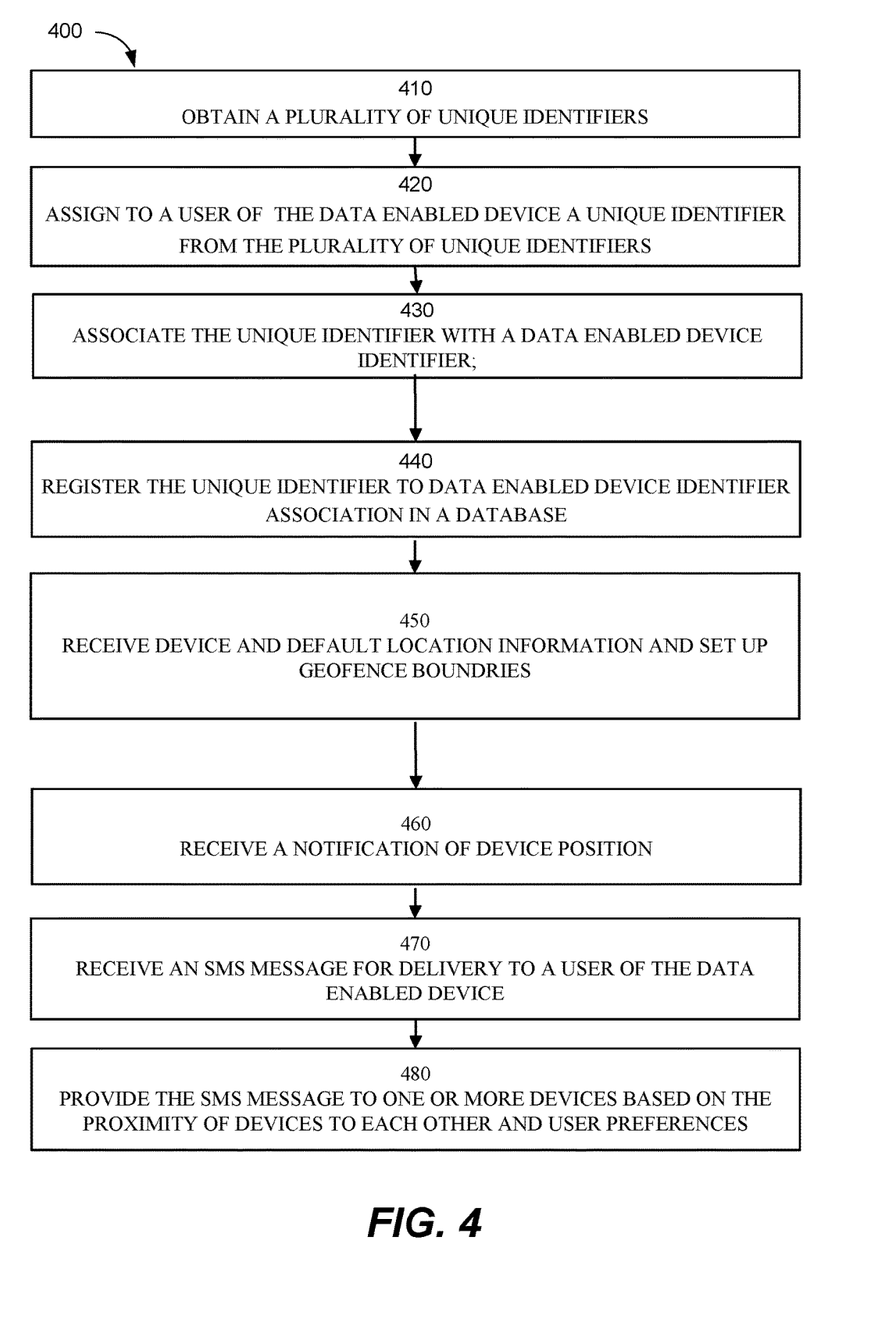
FIG. 4 is a flow chart of processing steps performed to intelligent presence detection messaging in accordance with embodiments disclosed herein.

In FIG. 4, flowchart 400 diagrams the overall process of delivery of SMS text messages facilitated by the social messaging hub 110 based on the location of several user data enabled devices. In step 410 the social messaging hub 110, obtains a plurality of unique identifiers. In step 420, a user of the data enabled device 26 is assigned a unique user identifier from the plurality of unique identifiers. In step 430, the unique user identifier is associated with a plurality of data enabled device identifiers, each one of plurality of data enabled device identifiers corresponding to one of a plurality of data enabled devices, and in step 440, the unique identifier to data enabled device identifier associations are registered in the database 126.

In step 450, device and default location information from at least one of the plurality of data enabled devices is received and geofence boundaries are set up. The user 105 using an application on one of several data enabled devices can specify: which devices should be associated with the unique identifier, where messages should be delivered when combinations of devices are within range of each other, the size of the boundaries (e.g., geofence ranges). In one embodiment, geofence boundaries are set in the devices to enable automatic notification of device proximity.

In step 460, a notification of device position is received from at least one of the plurality of data enabled devices. The notification can either be in the form of approximate position or some indication of proximity from the predetermined geofence boundaries. The notification can be delivered through SMS messaging, internet packets or other means which convey device presence or proximity to configured geofences. In step 470, a message is received for delivery to the user 105, and finally in step 480, the message is provided to at least one of the plurality of data enabled devices associated with the unique user identifier based on proximity of the one or more data enabled devices to each other and a predetermined user preference. In one embodiment, the message is a Short Message Service/Multimedia Messaging Service/Enhanced Messaging Service (SMS/MMS/EMS). User preferences include, but are not limited to, cost of message delivery, message delivery security and user display preferences which affect which devices are selected for message delivery.

Figure 5:
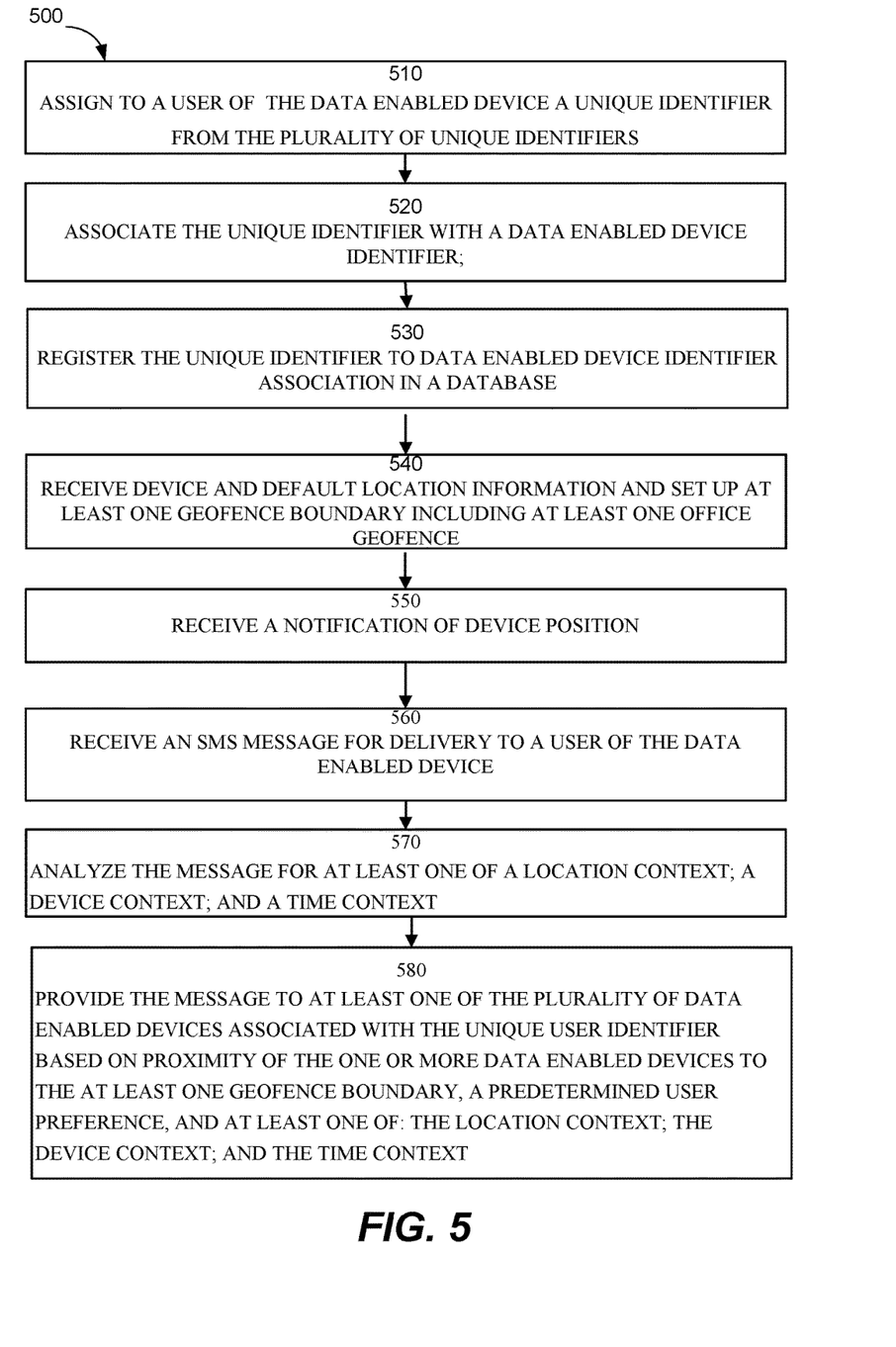
FIG. 5 is a flow chart of processing steps performed to intelligent presence detection messaging including message context processing in accordance with embodiments disclosed herein.

In FIG. 5, flowchart 500 diagrams the overall process of delivery of SMS text messages facilitated by the social messaging hub 110 based on the location of several user data enabled devices and the location, device and time context of an SMS message to be delivered. In step 510, a user of the data enabled device 26 is assigned a unique user identifier from the plurality of unique identifiers. In step 520, the unique user identifier is associated with a plurality of data enabled device identifiers, each one of plurality of data enabled device identifiers corresponding to one of a plurality of data enabled devices, and in step 530, the unique identifier to data enabled device identifier associations are registered in the database 126.

In step 540, device and default location information from at least one of the plurality of data enabled devices is received and geofence boundaries are set up. The user 105 using an application on one of several data enabled devices can specify: which devices should be associated with the unique identifier, where messages should be delivered when combinations of devices are within range of each other, the size of the boundaries (e.g., geofence ranges). In one embodiment, geofence boundaries are set in the devices to enable automatic notification of device proximity.

In step 550, a notification of device position is received from at least one of the plurality of data enabled devices. The notification can either be in the form of approximate position or some indication of proximity from the predetermined geofence boundaries. The geofence boundaries can include and office geofence which can be setup a semi-permanent geofence. The notification can be delivered through SMS messaging, internet packets or other means which convey device presence or proximity to configured geofences. In step 560, a message is received for delivery to the user 105, and in step 570, the received message is analyzed for at least one of a location context; a device context; and a time context. The analysis can be implemented using artificial intelligence or other techniques know in the art. Finally in step 580, the message is provided to at least one of the plurality of data enabled devices associated with the unique user identifier based on proximity of the one or more data enabled devices to each other and a predetermined user preference and one or more of the location context, the device context or the time context.

In one embodiment, the message is a Short Message Service/Multimedia Messaging Service/Enhanced Messaging Service (SMS/MMS/EMS). User preferences include, but are not limited to, cost of message delivery, message delivery security and user display preferences which affect which devices are selected for message delivery.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations and messaging embodiments provided above.

What is claimed is:

1. A method for electronic message delivery comprising:
   assigning to a user of a data enabled device a unique user identifier from a plurality of unique identifiers;
   associating the unique user identifier with a plurality of data enabled device identifiers, each one of plurality of data enabled device identifiers corresponding to one of a plurality of data enabled devices;
   registering the unique user identifier to data enabled device identifier associations in a database;
   receiving device and default location information from at least one of the plurality of data enabled devices;
   setting at least one geofence boundary including at least one geofence;
   receiving a notification of device position from at least one of the plurality of data enabled devices;
   receiving a message for delivery to the user;
   analyzing the message for at least one of
      a location context;
      a device context; and
      a time context; and
   providing the message to at least one of the plurality of data enabled devices associated with the unique user identifier based on:
   proximity of the one or more data enabled devices to the at least one geofence boundary;
   a predetermined user preference; and at least one of:
   the analyzed location context;
   the analyzed device context; and
   the analyzed time context.

2. The method of claim 1, wherein the predetermined user preference includes delivering the message to one or more of the data enabled devices based on a cost of message delivery.

3. The method of claim 1, wherein the predetermined user preference includes delivering the message to one or more of the data enabled devices based on message delivery security.

4. The method of claim 1, wherein the predetermined user preference includes delivering the message to at least one of the plurlality of data enabled devices associated with the unique user identifier and based on user display preferences.

5. The method of claim 1, wherein the predetermined user preference includes delivering the message to at least one of the plurality of data enabled devices associated with the unique user identifier and based on a preferred device corresponding to the analyzed device context.

6. The method of claim 1, wherein setting geofence boundaries comprises operating a location monitoring application on at least one of the data enabled devices.

7. The method of claim 1, wherein in response to user preferences and to determining that the message has not been read by the user and that a second device is within a geofence boundary of a first one of the plurality of data enabled devices, delivering the message to a different second one of the plurality of data enabled devices.

8. The method of claim 7 further comprising marking the delivered message read on a first device of the plurality of data enabled devices in response to determining that the message was read by the user on a second device of the plurality of data enabled devices.

9. The method of claim 1, wherein setting geofence boundaries includes proximity monitoring.

10. The method of claim 9, further comprising using Bluetooth low energy monitors, reporters and proximity profiles.

11. The method of claim 1, wherein the message is a Short Message Service/ Multimedia Messaging Service/Enhanced Messaging Service (SMS/MMS/EMS).

12. The method of claim 1, wherein an application on one of plurality of data enabled devices allows the user to specify:
    where messages should be delivered when combinations of devices are within range of each other; and
    a size of the geofence boundaries.

13. A non-transitory computer readable storage medium for storing thereon computer readable instructions for a method for electronic message delivery comprising:
    assigning to a user of a data enabled device a unique user identifier from a plurality of unique identifiers;
    associating the unique user identifier with a plurality of data enabled device identifiers, each one of plurality of data enabled device identifiers corresponding to one of a plurality of data enabled devices;
    registering the unique user identifier to data enabled device identifier associations in a database;
    receiving device and default location information from at least one of the plurality of data enabled devices;
    setting at least one geofence boundary including at least one office geofence;
    receiving a notification of device position from at least one of the plurality of data enabled devices;
    receiving a message for delivery to the user;
    analyzing the message for at least one of:
        location context;
        device context; and
        time context; and
    providing the message to least one of the plurality of data enabled devices associated with the unique user identifier based on proximity of the one or more data enabled devices to the at least one geofence boundary, a predetermined user preference, and at least one of:
    the analyzed location context;
    a analyzed device context; and
    the analyzed time context.

14. The method of claim 1, wherein setting at least one geofence boundary includes using at least one of the plurality of data enabled devices as a geofence.

15. The method of claim 14, wherein the at least one of the plurality of data enabled devices used as a geofence comprises a mobile phone beacon.

* * * * *